May 10, 1949.                    J. C. THOMAS                    2,469,752
                              PORTABLE HOUSING UNIT
Filed Aug. 4, 1945                                              4 Sheets-Sheet 2

Inventor
Joseph C. Thomas

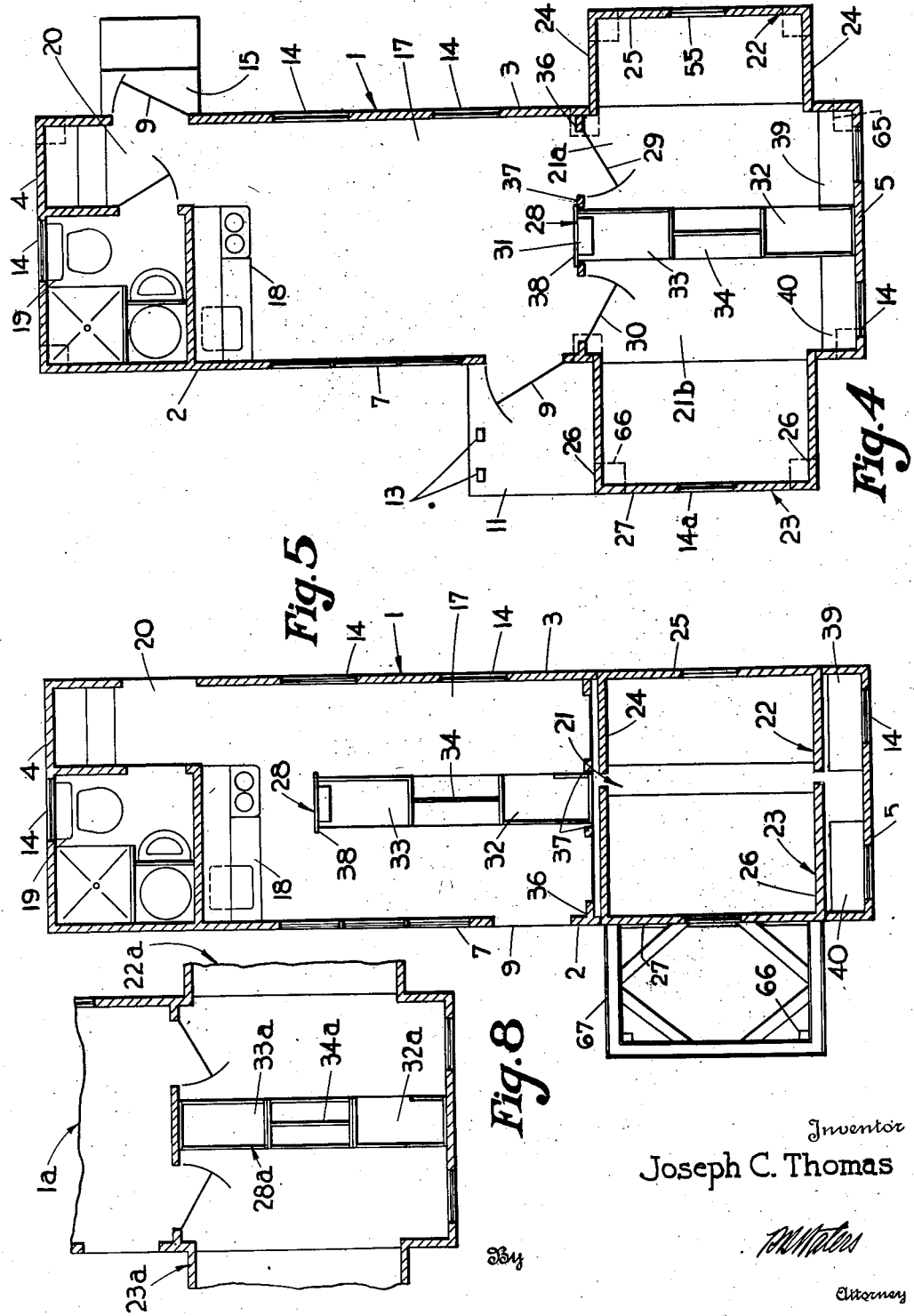

Patented May 10, 1949

2,469,752

UNITED STATES PATENT OFFICE 2,469,752

PORTABLE HOUSING UNIT

Joseph C. Thomas, Cuyahoga Falls, Ohio, assignor to Wingfoot Corporation, Akron, Ohio, a corporation of Delaware Application August 4, 1945, Serial No. 608,856

1 Claim. (Cl. 20—2)

The present invention relates to a portable housing unit. More particularly, the invention is concerned with a novel form of modern housing unit which can be advantageously constructed according to assembly line methods and is capable of being carried by rail or highway facilities to a central distributing point from which it is in turn transported to a site.

Other important features and objects of the present invention will become apparent as the following detailed description of a preferred embodiment of the invention illustrated by the accompanying drawings proceeds.

Figure 1:
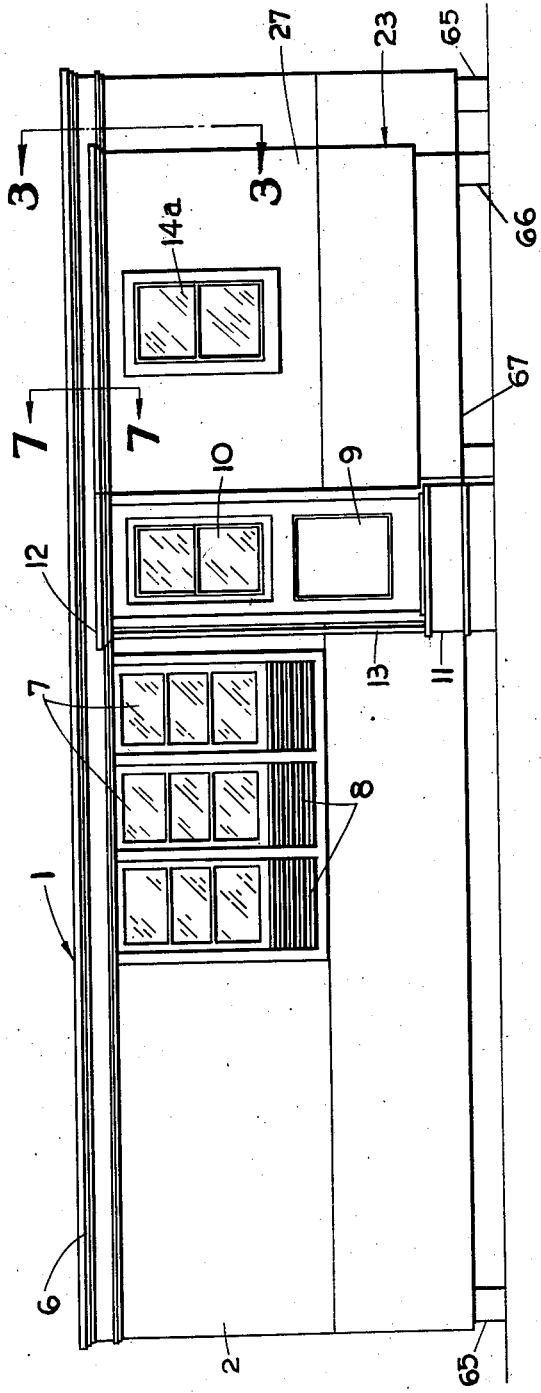
Figure 2:
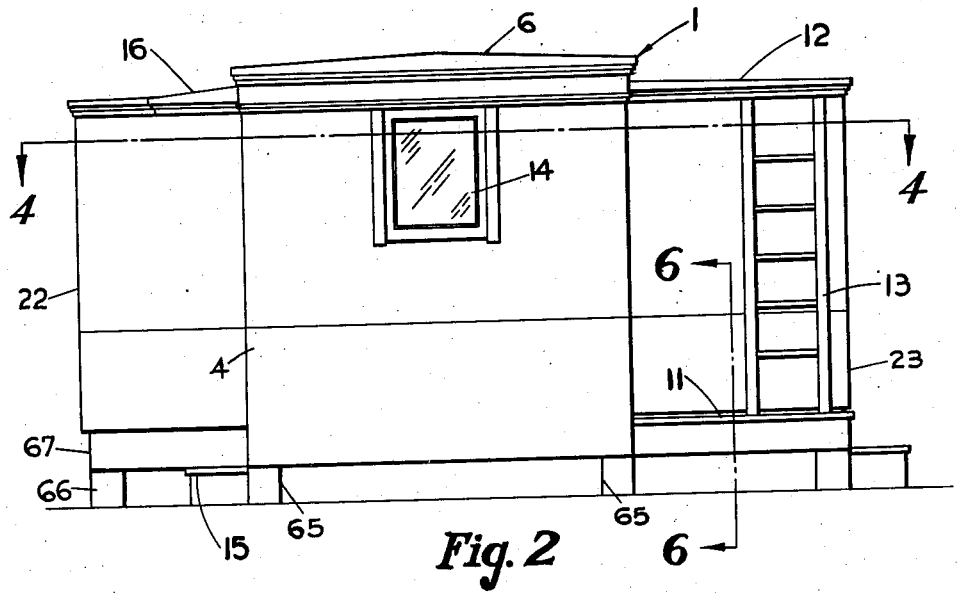
Figure 3:
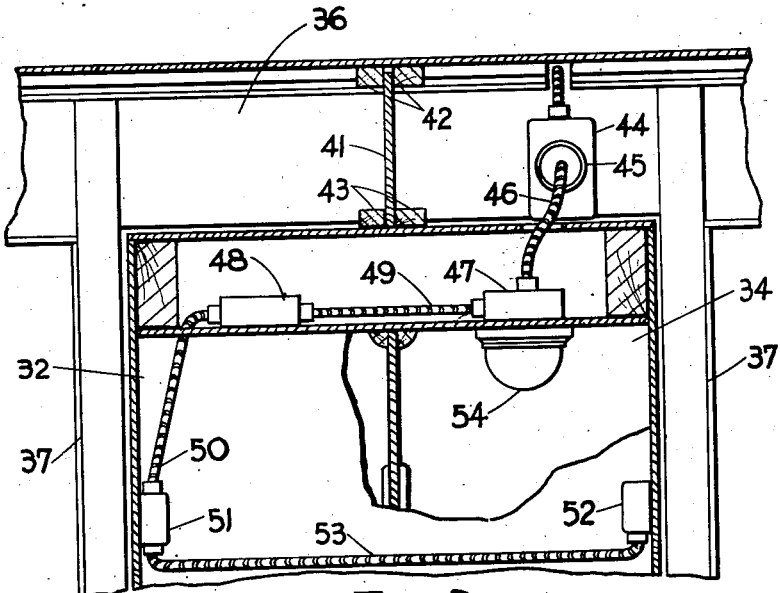
Figure 6:
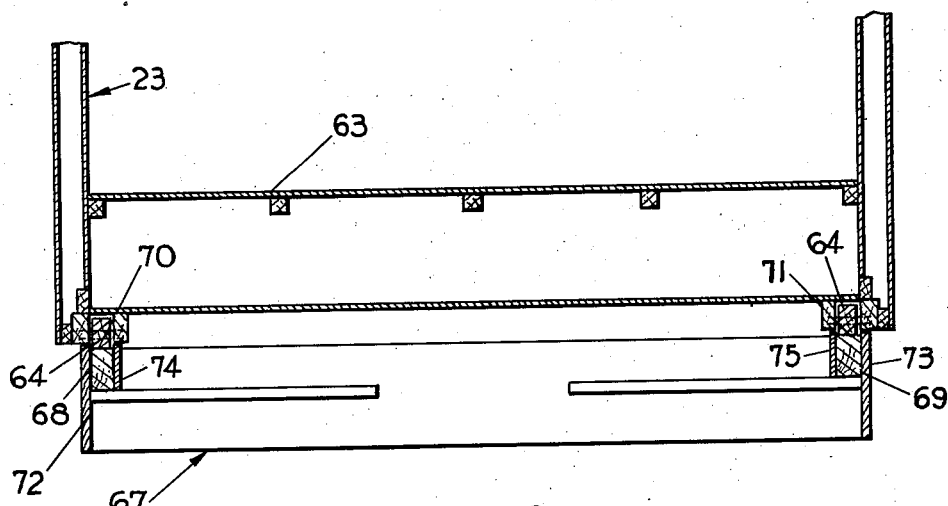
Figure 7:
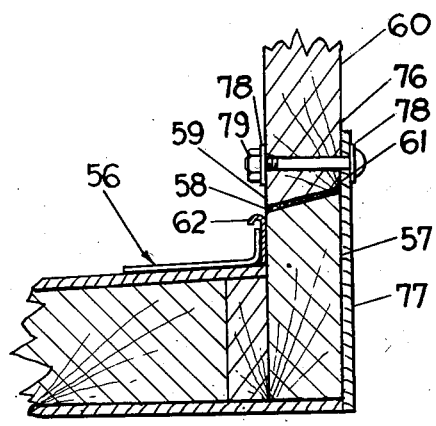

Figure 1 of the drawings represents a front elevation of one form of portable housing unit embodying the principles of the present invention and illustrated as being located upon a site. Figure 2 is an end elevation of the house of Figure 1. Figure 3 is a partial cross-section along the line 3—3 in Figure 1. Figure 4 is a plan view of the structure of Figure 1 as seen from the section line 4—4 in Figure 2. Figure 5 corresponds generally to Figure 4 and illustrates the structure in collapsed form preparatory to extension of one of the side walls. Figure 6 is a partial sectional view taken along the line 6—6 in Figure 2 and drawn at enlarged scale. Figure 7 is an enlarged partial cross-section as seen from the line 7—7 in Figure 1. Figure 8, which is generally similar to Figure 4, illustrates a modification of the invention.

In Figures 1 and 2 of the drawings, the preferred form of portable housing unit, indicated generally by the reference character 1, is shown in its expanded form ready for occupancy. The main structure of the house 1 embodies front wall 2, rear wall 3, and end walls 4 and 5 (see Figure 4) surmounted by a slightly pitched roof 6. The front wall 2 of the house 1 is provided with a plurality of stationary studio windows 7 having ventilating sections 8, which may advantageously take the form of a plurality of horizontally arranged fixed louvres, disposed therebelow.

The front wall 2 has a door 9 therein opening outwardly and containing a slidable sash window 10. Outside the door 9 in the front wall 2, there is a small stoop 11, having a roof 12 extending thereover. The roof 12 is adapted to be disengageably attached to the front wall 2 and supported by a latticed member 13 so as to provide a measure of protection for the door 9 against the weather. The walls 2, 3, 4 and 5 as well as the roof 6 and the floor of the house are advantageously formed of spaced inner and outer shells of plywood or other like construction between which a suitable insulating medium is inserted.

The rear wall 3 and end walls 4 and 5 may have any desired number of windows 14 disposed therein all of which are advantageously of the single sash casement type hinged at the top and adapted to open outwardly. A door 9 having a window 10 therein, substantially identical to the corresponding door in the front wall 2, may also be provided in the rear wall 3. A stoop 15 and roof portion 16 are shown as being secured to the rear wall 3 to serve as protection for the rear door of the house. All of the ventilating sections 8 and the several windows 10 and 14 are advantageously fitted with fly screens.

As will be seen from Figures 4 and 5 illustrating the floor plan of the house 1, the interior of the house is advantageously divided into a plurality of areas or rooms. A prominent feature of the house is the substantially centrally located living room area 17 at one end of which complete kitchen facilities, indicated generally by the reference character 18, are located. A complete bathroom 19 and an adjoining rear entry 20 are disposed adjacent the kitchen 18.

At the opposite end of the living room 17 from the kitchen 18 is located a bedroom area 21. It will be noted from Figures 4 and 5 that the bedroom area 21 houses two walled sections or bays 22 and 23. The bay 22 comprises opposed end walls 24 and side wall 25 while the bay 23 is made up of oppositely disposed end walls 26 joined by a side wall 27. The bays 22 and 23, which may be of the same or differing dimensions, are capable of being telescoped with respect to the interior of the bedroom area 21 of the house 1 to afford, when extended, a substantial increase in the area of the interior of the house structure.

A removable inner dividing wall or partition 28 makes possible the full utilization of the bedroom area 21. This partition 28 is capable of being projected into the living room 17 by sliding over the floor thereof to provide sufficient space in the bedroom area 21 to receive the bays 22 and 23 (see Figure 5). When the partition 28 is shifted into position against the end wall 5 of the house 1, the bedroom area 21 is divided into independent rooms 21a and 21b by reason of the cooperation therewith of the doors 29 and 30, respectively, affording entrance to the living room 17.

The partition 28, which is unitary in construction in its preferred form, advantageously includes a plurality of spaces or sections which may be utilized for storage purposes and the like. The partition 28 as illustrated in Figures 4 and 5, for example, embodies book shelves 31, closets 32 and 33 in combination with a section 34 housing a chest of drawers, shelves and a vanity mirror for each of the bedrooms 21a and 21b.

The movable partition 28, as illustrated in Figures 4 and 5, is a completely self-contained unit which is adapted to slide bodily over the floor of the living-room 17, the base of the frame being fitted with rollers, casters, sliders (convex metal inserts) or other suitable means (not shown) to facilitate its movement. The partition 28 advantageously fits into an opening in the wall 36 framed by studs 37 (see Figure 3). The end of the partition 28 in the living-room 17 has a facing 38 to cover the framing which outlines the opening in the wall 36.

The movable partition 28 when in place against the wall 5 of the house 1 fits snugly between the table tops 39 and 40 in rooms 21a and 21b, respectively, which may advantageously be used in combination with shelves or drawers to form a cabinet or vanity. A narrow board or panel 41 corresponding in length to the partition 28 and slidably fitted into place between the pairs of strips 42, 43 in the manner illustrated in Figure 3 cooperates with the partition to complete the enclosure of the rooms 21a and 21b.

A complete electrical wiring circuit is inserted in the partition 28 providing all the necessary electrical service for each of the rooms 21a and 21b. This is accomplished by mounted a plug-in receptacle 44 on the inside face of the wall 36 toward the bedroom area 21. A plug 45 on cable 46 permits the entire circuit to be disconnected for the shifting of the partition 28. The circuit includes the outlet boxes 47 and 48 interconnected by conductor 49 (the former being connected to the cable 46), conductor 50 and sidewall outlet boxes 51 and 52 interconnected by conductor 53. A light, such as the illustrated fixture 54, may be mounted overhead in the section 34 of partition 28 and connected to each of the boxes 47, 48 while a suitable plug-in receptacle (not shown) may be mounted in each of the boxes 51 and 52 in the walls of the closet 32.

The bay 22 encloses space of a size sufficient to house therein two single bunk beds (not shown) disposed one above the other. Ventilation for the bay 22 is afforded by the ventilators 55 in the side wall 25 thereof, one such ventilator being provided for each bunk. The bay 23 is of ample size to house therein a built in bunk corresponding to a full double bed. Bay 23 has a single sash casement window 14a in the side wall 27 thereof, similar to the windows 14 in the other walls of the structure, to provide ventilation.

The bays 22 and 23 are substantially completely self-contained units, as will be apparent from Figure 6, and are advantageously adapted to fit into openings provided in the front and rear walls 2 and 3, respectively, of the house 1. The several walls 24, 25 of bay 22 and walls 26, 27 of bay 23 in addition to the floors and roofs thereof are substantially identical in construction to the main walls, roof, and floor of the house 1. Thus, each bay is capable of being moved bodily into place and by virtue of a weather-proof joint 56 at the roof and end wall junctions with the walls 2 and 3 of the house 1 affords complete protection against the elements.

The joint 56 which is advantageously of the same design for roofs and end walls of both bays 22 and 23 embodies a frame member 57 which has a tapered face 58 (see Figure 7). The tapered face 58 of the member 57 cooperates with the oppositely tapered face 59 of the frame member 60 associated with the house wall in which the bay is mounted, when the bay in question is expanded. A strip 61 of felt or other similar material is secured to the frame member 57 adjacent the face 58 for sealing cooperation with the frame member 57. A metal flashing strip 62 is fixed to the outer face of the frame member 57 at the roof of the bay 23, a wood chamfer strip (not shown) being substituted for the strip 62 at the side walls. When the bays 22 and 23 are properly in place the entire structure is tightly sealed against the weather.

Since, as previously indicated, the bays 22 and 23 are of substantially identical construction, it will be unnecessary to describe both in detail, the bay 23 only being shown in Figure 6 of the drawings for the sake of simplicity. The floor 63 of bay 23, like the floor and walls of the house, is essentially a hollow shell of plywood or the like having its interior packed with suitable insulating material. The floor 63 has four rollers 64, one at each corner thereof, to support it and to enable it to be rolled with ease over the main floor of the house when the bay 23 is in its retracted position.

When the house 1 has reached the site where it is to be set up, a number of piers 65 of stone, concrete or other suitable material are placed on the ground with the base thereof preferably somewhat below the ground level. The house is then located upon the piers 65 with the bays 22 and 23 still in retracted position. The additional piers 66 are placed at positions spaced outwardly from the walls 2 and 3 and a frame 67 (see Figure 6) is positioned with its outermost corners resting upon the piers 66 and suitably secured at its other end to the base of the outer wall 2 (in the illustrated instance) adjacent the opening therein for the bay 23.

After the frame 67 is in place, the uppermost edges of the side rails 68, 69 having tracks or grooves 70, 71 formed therein between the plates 72, 73 and guides 74, 75, respectively, which may be of metal. The grooves 70, 71 receive the rollers 64 as the bay 23 is moved over the main floor of the house 1 to its extended position. The frame 67 is so designed that, when it is properly in place, the base of the grooves 70, 71 will be substantially level with the surface of the floor in the bedroom area 21 housing the bay 23 to insure ease of handling after the house has been erected and is to be made ready for occupancy.

When the bay 23 has been moved into its fully extended position on the frame 67, the frame member 57 thereof cooperating with the frame member 60 of the house structure to form the weatherproof joint 56 will be tightly sealed. The opposed faces 58 and 59 of members 57 and 60, respectively, compress the felt strip 61 and this insures a positive sealing engagement at all times. Any suitable securing means may be employed to hold the parts in this relation such, for example, as a plurality of bolts 76 extending through the facing 77 on the inner face of the frame member 57 inside the house and the frame member 60. The bolts 76 are provided with washers 78 and nut 79.

Figure 8 illustrates a modification of the invention which contemplates the removal of the partition 28a in the form of a number of individual interfitting sections 32a, 33a, and 34a rather than as a unit, as in the case of partition 28 in Figure 4.

With this exception, the house 1a embodies all of the features of the previously described embodiment of the invention.

Other modifications, which may readily be incorporated in the housing unit of the present invention and which will be apparent to those skilled in the art may be made without departing from the spirit or scope of the invention. Among other things, several additional bays may be embodied in the structure, either in the side walls or the end walls or both, if desired. Moreover the bay 22 may be so modified that it houses a full size double bed in place of the tiers of single bunks and the partition 28 or 28a may be adapted to include therein a greater or lesser number sections or divisions as may be desired.

While in accordance with the patent statutes one best known embodiment of the invention has been illustrated and described in detail, it is to be particularly understood that the invention is not limited thereto or thereby, but that the inventive scope is defined in the appended claim.

What I claim is:

In a portable house unit embodying a plurality of closure walls and partitions defining a number of rooms at least two of which are separated by a fixed partition having an opening therein, a walled section inserted in a portion of each of the opposed closure walls defining the first of the aforementioned two rooms, said walled sections being disposed in telescopic relation to the interior of said room and when in retracted position substantially filling the same, and a movable partition mounted in the opening in the fixed partition for slidable movement from a position wholly within the first of the two rooms for dividing the space therein defined by the fixed partition, the walled sections in their extended position and the closure walls and portions thereof into at least two separate adjoining rooms to another position wholly within the second of the two rooms enabling the first room to receive the retracted walled sections.

JOSEPH C. THOMAS.

REFERENCES CITED

The following references are of record in the file of this patent:

UNITED STATES PATENTS

| Number | Name | Date |
|---|---|---|
| 1,417,736 | Heygate | May 30, 1922 |
| 1,477,660 | Monroe | Dec. 18, 1923 |
| 1,521,635 | Lewis | Jan. 6, 1925 |
| 1,988,585 | Dath | Jan. 22, 1935 |

OTHER REFERENCES

The Architectural Forum, Sept. 1942, pages 140, 141 and 142.